L. G. LE COMPTE.
LIQUID LEVEL GAGE.
APPLICATION FILED JULY 27, 1916.

1,278,949.

Patented Sept. 17, 1918.
2 SHEETS—SHEET 1.

WITNESSES

INVENTOR
Leon G. LeCompte,
BY
ATTORNEYS

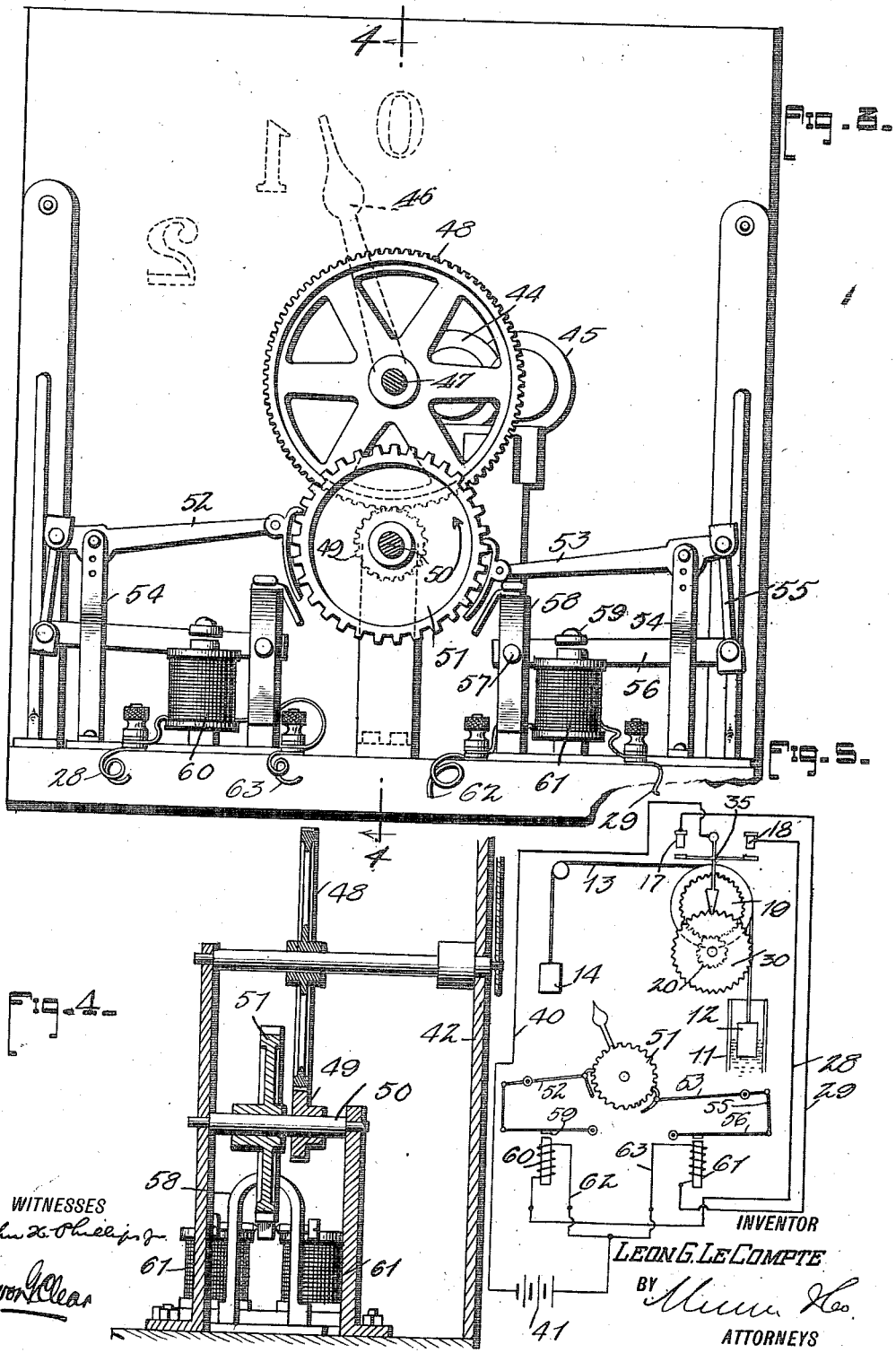

UNITED STATES PATENT OFFICE.

LEON GERALD LE COMPTE, OF McKITTRICK, CALIFORNIA, ASSIGNOR OF ONE-HALF TO ANDREW J. KNOBLOCK, OF McKITTRICK, CALIFORNIA.

LIQUID-LEVEL GAGE.

1,278,949.   Specification of Letters Patent.   Patented Sept. 17, 1918.

Application filed July 27, 1916. Serial No. 111,681.

*To all whom it may concern:*

Be it known that I, LEON G. LE COMPTE, of McKittrick, in the county of Kern and State of California, have invented a certain new and useful Improvement in Liquid-Level Gages, of which the following is a specification.

My present invention relates generally to gages, and more particularly to liquid level gages, my object being to provide an automatic gage for the measurement of liquids in tanks, vats, or other receptacles, or for measuring the rise and fall of lakes, rivers, and other bodies of water, and transmitting and registering the results of such measurements at distant points.

More specifically, my present improvements relate to the annunciator involved in the above construction, which I term the register, my aim being the provision of a positive, quick-acting arrangement, of simple and inexpensive construction, and acting with the circuit completing arrangement for turning the indicating member when a circuit is completed.

The means provided by my invention for carrying out the above, may be well understood by reference to the accompanying drawings, hereinafter referred to, and forming part of this specification. In these drawings:

Fig. 3 is a rear elevation of the registering dial and the register actuating parts.

Fig. 4 is a detail vertical section taken substantially on line 4—4 of Fig. 3.

Fig. 5 is a diagram of a complete mechanism in which my present improvements are utilized.

Figures 1, 2:
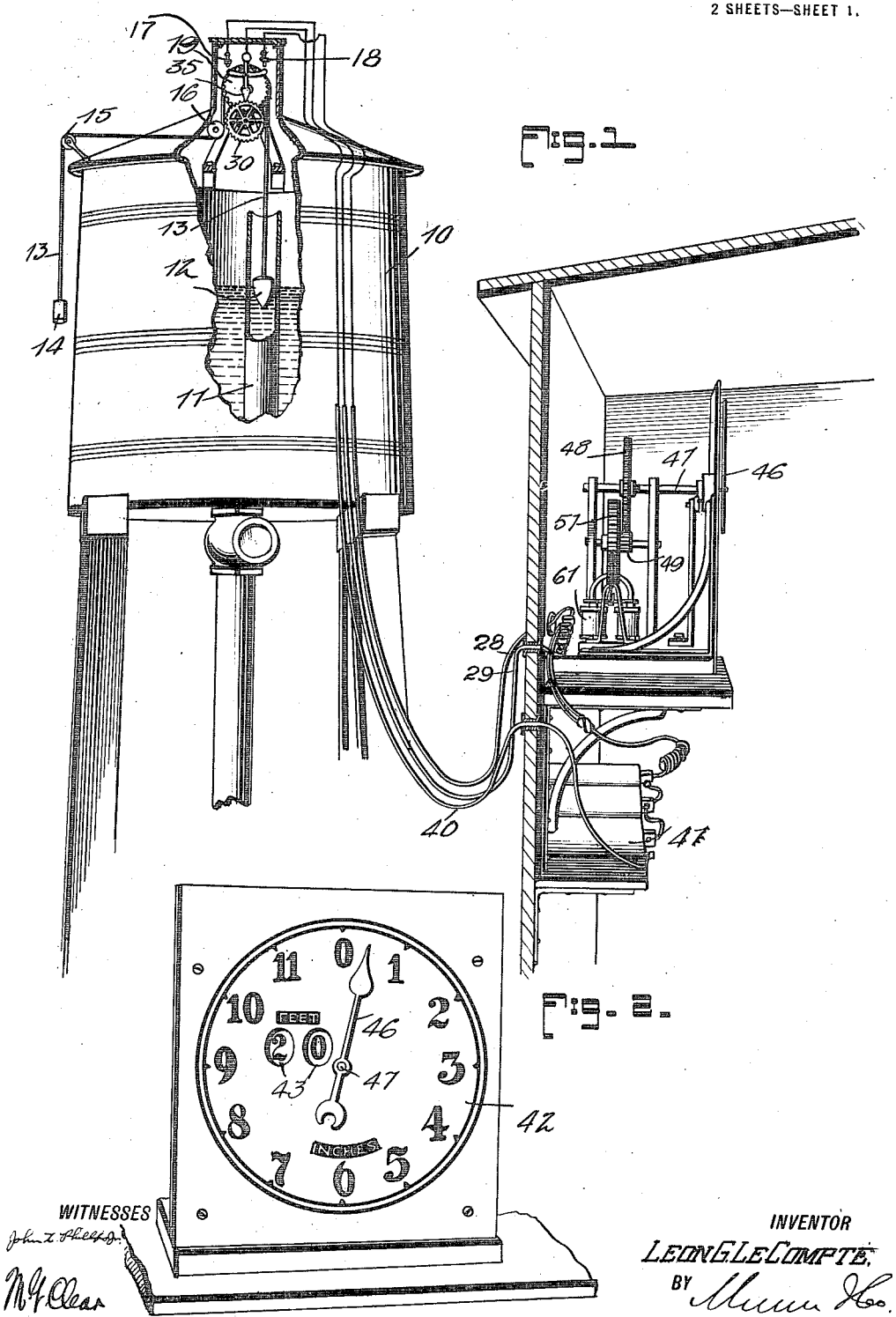
Figure 1 is a perspective view, partly broken away and in section, illustrating my invention complete.
Fig. 2 is a detail perspective view of the registering dial.

Referring now to these figures, I have by way of explanation shown my improvements in Fig. 1 in connection with a tank 10, although it is to be understood that these improvements are adapted as well for the measurement of liquids in vats or in fact any other liquid receptacles, as well as for measuring the rise and fall of lakes, rivers, and other bodies of water, as hereinafter well understood, the tank 10 in the present illustration being shown as including a perforated vertically disposed guide tube 11 in which is mounted a float member 12 connected to one end of a flexible rope or cable 13 at the opposite end of which is a counterweight 14.

This rope or cable 13 passes around guide pulleys 15 and 16, and over a pulley 19 which, through suitable gearing connections, actuates a toothed wheel 30, the latter acting to shift a circuit-closing member 35 into engagement with contacts 17 and 18, dependent upon the direction of movement of said toothed wheel 30. To this circuit-closing member 35, a battery lead 40 extends, the battery being seen at 41, and from the contacts 17 and 18, circuit wires 28 and 29 lead to electro-magnets 60 and 61 seen in Fig. 3, in particular. Branch wires 62 and 63, as seen in Fig. 3, lead from these electro-magnets to the battery 41. The foregoing will be even more plainly apparent by reference to the diagram of the complete device in Fig. 5.

The registering mechanism provided by this invention, and as seen in Figs. 1, 2, 3, and 4, consists of a stationary dial 42 having openings 43 through which the numerals of rotating dials 44 and 45 show, the pointer 46 coöperating with the stationary dial 42, being secured upon a shaft 47 provided at a point rearwardly beyond the dial 42, with a gear wheel 48 in mesh with a gear wheel 49 mounted upon a parallel shaft 50, the latter of which is provided with a ratchet wheel 51.

Ratchet levers 52 and 53, as shown in Fig. 3 in particular, engage opposite sides of the ratchet wheel 51, and are each fulcrumed upon a support 54. The levers 53 are also connected at their rear or outer ends beyond the support 54, and by means of links 55, to the outer ends of levers 56, the latter of which are pivoted at their inner ends at 57, to supports 58 and are attached intermediate their ends to the armatures 59 of electromagnets 60 and 61.

Thus, referring to the diagram Fig. 5, when the circuit closing lever 35 is swung to contact with the contact member 17, the electro-magnet 61 is energized and by actuation of the ratchet lever 53, the ratchet wheel 51 is turned in the direction of the arrow in Fig. 3, while when the said lever is swung in the opposite direction to make contact with the contact member 18, the electro-magnet 60 is energized and the ratchet lever 52 actuated to move the ratchet wheel 51 in the opposite direction.

In this way the height or level of the liquid in tanks, vats, or other receptacles may be known at a considerable distance therefrom, and at all times by reference to the registering dial, and the rise and fall of water in lakes, rivers, and other bodies of water may be readily computed therefrom by reference to the normal level.

It is further to be observed that I am enabled to accomplish the foregoing by means which are not only simple and economical in comparison to other and well known means for this purpose, but means which will be effective at all times and which will be strong and durable in use.

I claim:

1. In a liquid level gage, a register including a registering member, a toothed wheel having a geared connection with said member, a pair of levers having inner ratchets engaging opposite sides of said toothed wheel, supports upon which said levers are fulcrumed, a pair of electro-magnets, an armature for each thereof, levers to which said armatures are attached, and links connecting said last-named levers with the respective ratchet levers.

2. In a device of the character described, a register including a registering member, a toothed wheel having a geared connection with said member, a pair of levers disposed at opposite sides of said toothed wheel and having ratchet members at their inner ends in engagement with the toothed periphery of the wheel, supports upon which said levers are fulcrumed, links connected to and depending from the outer ends of said levers, a pair of electro-magnets, armatures therefor, and levers pivoted at their inner ends at opposite sides of said toothed wheel and connected at their outer ends to the lower ends of said links, said last named levers carrying, at intermediate points, the said armatures of said electro-magnets, and being actuated thereby.

LEON GERALD LE COMPTE.